United States Patent [19]

Sauer et al.

[11] Patent Number: 5,492,374
[45] Date of Patent: Feb. 20, 1996

[54] SEPARABLE INSERTION-TYPE PIPE CONNECTION

[75] Inventors: Axel Sauer, Nürtingen; Günther Wiesner, Ohmden; Frank van de Poel, Rottenburg; Kurt Schaible, Aidlingen, all of Germany

[73] Assignee: Hydraulik-Ring, Weberstrasse, Germany

[21] Appl. No.: 76,128

[22] Filed: Jun. 14, 1993

[30] Foreign Application Priority Data

Jun. 12, 1992 [DE] Germany ............... 42 19 235.8

[51] Int. Cl.⁶ .................................................. F16L 37/12
[52] U.S. Cl. ............................................. 285/305; 285/348
[58] Field of Search ................................. 285/305, 319, 285/348, 321, 108, 349, 350

[56] References Cited

U.S. PATENT DOCUMENTS

| | | | |
|---|---|---|---|
| 3,185,501 | 5/1965 | Bowan et al. | 285/348 |
| 3,430,990 | 3/1969 | Nelson | 285/348 |
| 3,517,951 | 6/1970 | Dunmire | 285/348 |
| 4,781,400 | 11/1988 | Cunningham | 285/319 |
| 4,828,297 | 5/1989 | Tarum | 285/348 |
| 4,844,515 | 7/1989 | Field | 285/321 |
| 4,913,467 | 4/1990 | Washizu | 285/319 |
| 5,127,682 | 7/1992 | Washizu | 285/319 |
| 5,160,175 | 11/1992 | Yang | 285/108 |
| 5,171,028 | 12/1992 | Bartholomew | 285/319 |
| 5,207,462 | 5/1993 | Bartholomew | 285/321 |
| 5,275,448 | 1/1994 | McNaughton et al. | 285/319 |
| 5,310,227 | 5/1994 | Grinsteiner | 285/348 |

FOREIGN PATENT DOCUMENTS

| | | | |
|---|---|---|---|
| 1206679 | 12/1965 | Germany. | |
| 35488 | 9/1972 | Japan | 285/348 |
| 69825 | 6/1979 | Japan | 285/348 |

Primary Examiner—Eric K. Nicholson
Attorney, Agent, or Firm—Evenson, McKeown, Edwards & Lenahan

[57] ABSTRACT

A separable insertion-type connection is provided for pipes. By way of an end piece having an exterior collar, a pipe can be sealingly inserted into an inserting opening of a connecting body which receives an elastic sealing ring as well as a supporting ring which, in the inserting direction, is arranged in front of the sealing ring and rests against the opening wall. The pipe can then be axially fixed in the inserting opening by a holding part which can be mounted on the connecting body. The insertion-type connection provides long service life of its sealing ring under extreme conditions. For this purpose, the supporting ring is equipped on its face which faces the sealing ring with a sealing lip which sealingly encloses the pipe end piece. As a result, it is achieved that, when acted upon by pressure, the sealing lip, independently of component tolerances, is pressed in a form-locking manner against the circumference of the pipe end piece. An annular gap between the supporting ring and the pipe end piece is closed off, and thus a destruction of the sealing ring by gap extrusion is prevented.

9 Claims, 1 Drawing Sheet

SEPARABLE INSERTION-TYPE PIPE CONNECTION

BACKGROUND AND SUMMARY OF THE INVENTION

The present invention relates to a separable insertion-type connection for pipes, and, more particularly, to a separable connection in which an end piece of a pipe having an exterior collar can be inserted into an inserting opening of a connecting body, comprising a supporting ring received in the connecting body resting against a wall thereof, an elastic sealing ring arranged behind the supporting ring in an inserting direction, and a holding part configured to reach over the exterior collar and to be fixed with respect to the connecting body such that the pipe is fixable in the inserting opening.

An insertion-type connection in high-pressure pipes is described in German Patent DE-OS 1 475 643. In this construction, the supporting ring has a rectangular cross-section, and is arranged between the exterior collar of the pipe and the elastic sealing ring for supporting the latter. The ring is indisplaceably inserted into the inserting opening of the connecting body, with an annular gap existing between the connecting body and the pipe end piece penetrating the sealing ring.

In sealing rings made of an elastomer, and suitable for extremely low temperatures of, for example, −40° and therefore constructed to be correspondingly soft, the annular gap might result in the destruction of these sealing rings because of a gap extrusion correspondingly high internal pressures (for example, 200 bar). In another insertion-type connection, as described in German Patent DE-AS 1 206 679, this disadvantage was avoided because of the fact that the sealing ring constituting as a sealing lip is molded onto the supporting ring face which faces away from the exterior collar of the pipe and which consists of the same elastic material as the sealing lip.

The thus formed known elastic inserting ring carries out a sealing function as well as a supporting function. The ring is, in turn, arranged in the inserting opening of the connecting body by way of a press fit, on the pipe end piece by way of a sliding fit, and displaceably when subjected to pipe pressure. The inserting ring is forced in the direction of the exterior collar of the pipe, with its interior ring edge facing the exterior collar of the pipe forming a sealing fit for the exterior collar of the pipe constructed as a bead. The resulting prevention of the gap extrusion of the sealing ring (or sealing lip) enclosing the pipe end piece had, however, the disadvantage that, in the event of extreme usage conditions caused by high temperatures and pressures, the inserting ring could creep in the area of the annular gap existing between the wall of the inserting opening and the exterior collar of the pipe.

The present invention has an object of improving a separable insertion-type connection for pipes such that it is distinguished by a long service life of its sealing ring, particularly under extreme usage conditions.

This object has been achieved in accordance with the present invention by providing a sealing lip on the supporting ring face opposite the sealing ring to enclose the pipe end piece in a sealing manner.

The sealing lip in accordance with the present invention is provided on the supporting ring on the side of the sealing ring when acted upon by pressure and is pressed more intensively, irrespective of component tolerances, in a form-locking manner onto the outer circumference of the pipe end piece. As a result, an annular gap which exists between the supporting ring and the pipe end piece is enclosed, and thus a gap extrusion is effectively provided in the event of high pressures and temperature which would result in the destruction of the sealing ring.

A further feature of the present invention offers the advantage that the supporting ring on the sides of the sealing ring also has a sealing lip in the area of its outer edge and both sealing lips end in a common radial plane. Therefore, the sealing ring will be uniformly supported on both sealing lips, in which the sealing lips are uniformly pressed against the circumferential wall or the pipe wall because of the conical construction of the face of the supporting ring.

Another feature of the present invention results in the advantage that a creeping of the supporting ring through the ring gap existing between the opening wall and the exterior collar of the pipe can be prevented without the use of any auxiliary devices, particularly in the event of high temperatures (for example, +120°) and pressures.

A still further aspect of the present invention offers the advantage of a manufacturing of the supporting ring that is particularly simple with respect to manufacturing techniques. In the event of extreme temperatures and pressures, however, this construction requires a measure for preventing a gap extrusion of the supporting ring between the opening wall and the exterior collar of the pipe, which can be achieved advantageously according to the present invention by arranging a closing body between the elastic supporting ring and the exterior collar of the pipe to bridge a radial gap existing between the exterior collar and the opening wall. Preferably, the closing body is a cup-type closing element provided for closing of the gap and closes the annular gap preferably along its entire length. During its manufacturing as a stamped part or a deep-drawn part, the element can be calibrated relative to the diameter of the inserting opening with respect to tolerances such that a reliable gap closure is ensured.

As a result of the configuration of the cup-shaped closing element, by way of its bottom penetrated by the pipe end piece, to reach behind the face of the outer sleeve of the pipe supported on the holding part, which face is opposite or facing the supporting ring, an undisplaceable arrangement of the closing body in the inserting opening is ensured also in the case of very large axial forces directed through the supporting ring onto the closing body.

BRIEF DESCRIPTION OF THE DRAWINGS

These and other objects, features and advantages of the present invention will become more apparent from the following detailed description thereof when taken in conjunction with the accompanying drawings wherein.

DETAILED DESCRIPTION OF THE DRAWINGS

Figure 1:
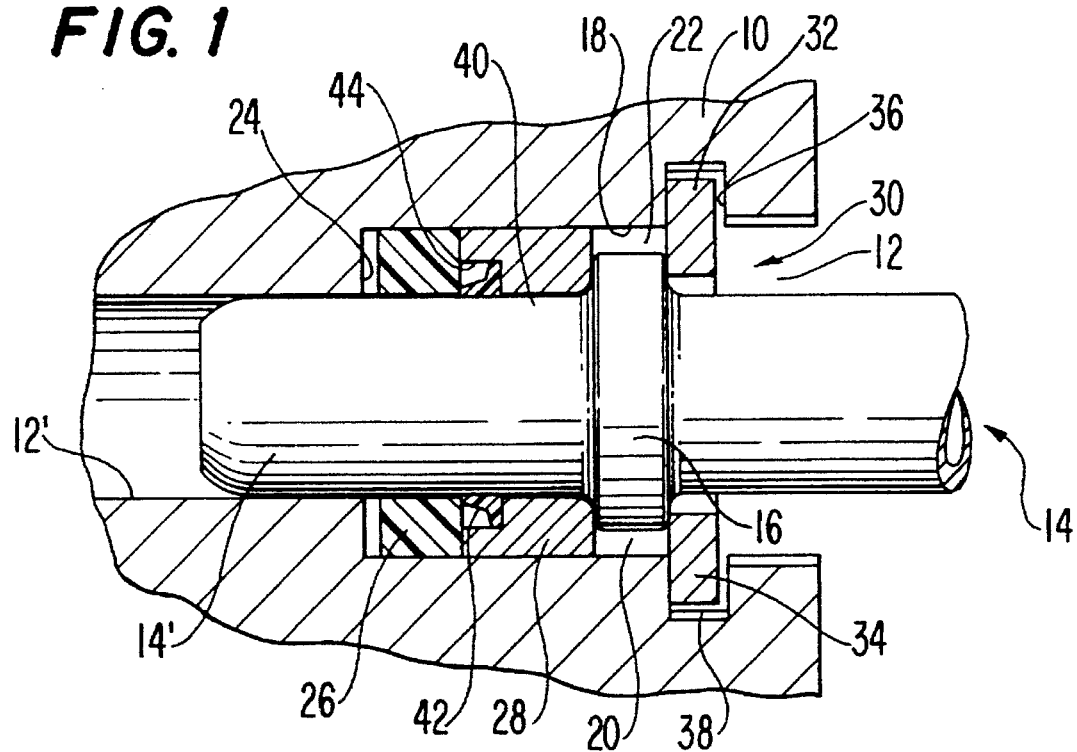
FIG. 1 is a partial sectional longitudinal view of an embodiment of an insertion-type connection in accordance with the present invention.

In FIG. 1, a connecting body 10 of a hydraulic or pneumatic arrangement of a motor vehicle has an inserting opening 12 into which an end piece 14' of a high-pressure pipe 14 is inserted. As shown in the drawings, the insertion direction is to the left.

The outside diameter of the pipe 14 can be, for example, 3 mm. The pipe end piece 14' has an exterior collar 16 which is manufactured, for example, by an upsetting operation and whose outside diameter is smaller than the inside diameter of the inserting opening 12 so that an annular gap 22 remains between the two circumferential surfaces 18 and 20. The inserting opening 12 forms a widened diameter inlet section of a bore 12' penetrating the connecting body 10. The diameter of the bore 12' adapted to that of the pipe end piece 14 such that the latter can easily be pushed into this bore.

An elastomer cylindrical sealing ring 26 is inserted into the inlet section of the inserting opening 12, adjacent to its interior ring shoulder 24. The inside diameter of the sealing ring 26 is smaller than the outside diameter of the pipe end piece 14' to such an extent that, when the latter is pushed through, the sealing ring 26 experiences a sufficient radial widening to ensure a perfect sealing of the insertion-type connection in the event of extremely high existing hydraulic or pneumatic pressures.

Furthermore, between the sealing ring 26 and the exterior collar 16 of the pipe, a metal supporting ring 28, made particularly of steel, is arranged by way of a press fit in the widened inlet section of the inserting opening 12. The sealing ring 26 is supported on the ring 28 which is used as an inserting stop for the pipe end piece 14' in that the exterior collar of the pipe end piece 14' comes to rest thereagainst.

A holding part designated generally by numeral 30, such as a fork-shaped securing bow can, by way of its fork legs 32, 34, be pushed into inserting openings 36, 38 which extend in the connecting body 10 radially with respect to the inserting opening 12. The fork legs 32, 34 are placed against the face of the exterior collar 16 of the pipe which faces away from the supporting ring 28 and secure the pipe end piece 14' in the shown inserted position in the inserting opening 12.

In order to avoid that the sealing ring 26 is partially displaced into the annular gap 40 between the pipe end piece 14' and the interior circumferential surface of the supporting ring 28 under the effect of high pressure and may thus be destroyed by gap extrusion, the supporting ring 28 is equipped on its face which faces or is opposite the sealing ring 26, in the area of its interior ring edge, with a vulcanized-on (or molding on) sealing lip 42 which rests under prestress against the pipe end piece 14'. The sealing lip 42 is provided inside an end section 44 of the ring bore which has a widened diameter and is flush with the ring face resting against the sealing ring 26. When pressure exists at the sealing ring 26, an axial deformation of the sealing lip 42 into the annular gap 40 will thereby be avoided by virtue of this arrangement.

Figure 2:
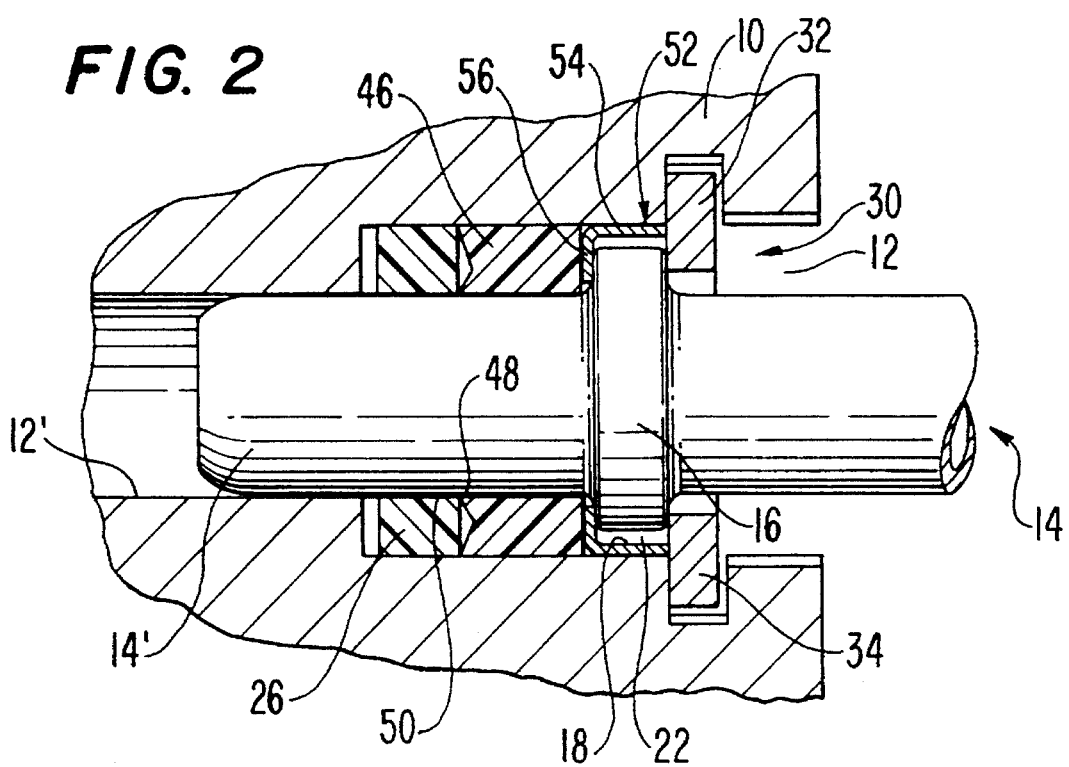
FIG. 2 is a partial sectional longitudinal view of another embodiment of an insertion-type connection in accordance with the present invention.

In the embodiment according to FIG. 2, parts which correspond to corresponding parts of the embodiment of FIG. 1, have the same reference numbers and will not again be described in detail. The constructional difference with respect to the first-mentioned embodiment is the construction of the supporting ring 46 which is manufactured completely from a dimensionally stable plastic material.

On its face facing the sealing ring 26, the supporting ring 46 has, in the area of its inner and outer circumferential edge, one sealing lip 48, 50 respectively, each of which ensures a sealing of the section of the inserting opening 12 which accommodate the sealing ring 26 with respect to its interior circumference and with respect to the outer circumference of the pipe end piece 14'. These sealing lips 48, 50 are shaped out of the supporting ring face which is configured to taper conically, preferably asymmetrically, toward the inside, i.e. axially along the central axis.

The annular gap 22 existing between the exterior collar 16 and the interior circumferential surface 18 of the inserting opening 12 is closed off by a cup-shaped closing body designated generally by numeral 52 which reaches, via a collar 54, over the exterior collar 16 of the pipe with a radial distance, rests sealingly on the interior circumferential surface 18 of the inserting opening 12, and is supported preferably on the fork legs 32, 34 of the holding part 30. By way of the cup bottom 56, the closing body 52 reaches over the exterior collar 16 of the pipe to rest thereagainst, and is penetrated by the pipe end piece 14'.

The closing body 52 therefore ensures that also a creeping of the elastic material of the supporting ring 46 through the ring gap 22 is prevented under extreme usage conditions. Instead of the cup-shaped closing body 52, a ring-shaped closing body can also be provided which is inserted via a press fit into the inserting opening 12.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A separable insertion-type connection for pipes, comprising an end piece of a pipe having an exterior collar configured no be inserted into an inserting opening of a connecting body, a supporting ring received in the connecting body so as to rest against a wall thereof, an elastic sealing ring arranged, as viewed in an inserting direction, behind the supporting ring, and a holding part configured to reach over the exterior collar and to be fixed with respect to the connecting body such that the pipe is fixable in the inserting opening, wherein the supporting ring has a face opposing the sealing ring and a sealing lip extending from the face configured to enclose the pipe end piece and prevent intrusion of the sealing ring into a gap defined between the pipe end piece and an interior surface of the supporting ring.

2. The insertion-type connection according to claim 1, wherein the face of the supporting ring facing the sealing ring, from the sealing lip to an exterior edge portion thereof, is conically widened, and the sealing lip ends in a radial plane containing the exterior edge portion.

3. The insertion-type connection according to claim 1, wherein the supporting ring is a metal ring, and the sealing lip is a vulcanized-on on the metal supporting ring.

4. The insertion-type connection according to claim 3, wherein the face of the supporting ring facing the sealing ring, from the sealing lip to an exterior edge portion thereof, is conically widened, and the sealing lip ends in a radial plane containing the exterior edge portion.

5. The insertion-type connection according claim 1, wherein the supporting ring and the sealing lip form an elastic material molded body and the degree of hardness of the sealing lip is less than that of the supporting ring.

6. The insertion-type connection according to claim 5, wherein the face of the supporting ring facing the sealing ring, from the sealing lip to an exterior edge portion thereof, is conically widened, and the sealing lip ends in a radial plane containing the exterior edge portion.

7. The insertion-type connection according to claim 5, wherein, between the elastic supporting ring and the exterior collar of the pipe, a closing body is arranged so as to bridge a radial gap between the exterior collar of the pipe and an opening wall of the connecting body.

8. The insertion-type connection according to claim 7, wherein the closing body is cup-shaped and configured to rest, via a collar thereof reaching over the exterior collar of the pipe, sealingly against the opening wall and reaches via a bottom thereof penetrated by the pipe end piece behind a face of the exterior collar of the pipe facing the supporting ring.

9. The insertion-type connection according to claim 8, wherein the face of the supporting ring facing the sealing ring, from the sealing lip to an exterior edge portion thereof, is conically widened, and the sealing lip ends in a radial plane containing the exterior edge portion.

\* \* \* \* \*